United States Patent
Qin et al.

(10) Patent No.: US 10,482,389 B2
(45) Date of Patent: Nov. 19, 2019

(54) PARALLEL DEVELOPMENT AND DEPLOYMENT FOR MACHINE LEARNING MODELS

(71) Applicants: Bin Qin, Phoenix, AZ (US); Farooq Azam, Scottsdale, AZ (US); Denis Malov, Scottsdale, AZ (US)

(72) Inventors: Bin Qin, Phoenix, AZ (US); Farooq Azam, Scottsdale, AZ (US); Denis Malov, Scottsdale, AZ (US)

(73) Assignee: SAP SE, Walldorf (DE)

( * ) Notice: Subject to any disclaimer, the term of this patent is extended or adjusted under 35 U.S.C. 154(b) by 557 days.

(21) Appl. No.: 14/560,484

(22) Filed: Dec. 4, 2014

(65) Prior Publication Data

US 2016/0162800 A1 Jun. 9, 2016

(51) Int. Cl.
*G06N 3/08* (2006.01)
*G06N 20/00* (2019.01)

(52) U.S. Cl.
CPC .............. *G06N 20/00* (2019.01); *G06N 3/082* (2013.01); *G06N 3/08* (2013.01)

(58) Field of Classification Search
None
See application file for complete search history.

(56) References Cited

U.S. PATENT DOCUMENTS 5,909,681 A 6/1999 Passera et al.

OTHER PUBLICATIONS

Payzan-LeNestour, Bayesian Learning in Unstable Settings: Experimental Evidence Based on the Bandit Problem, Swiss Finance Institute Research Paper No. 10-28, Oct. 20, 2010, pp. 1-43.*

Payzan-LeNestour, Bayesian Learning in Unstable Settings: Experimental Evidence Based on the Bandit Problem, Swiss Finance Institute Research Paper No. 10-28, Oct. 20, 2010, pp. 1-43 (Year: 2010).*

"Artificial neural network", Wikipedia, [Online]. Retrieved from the Internet: <URL: http://en.wikipedia.org/w/index.php?title=Artificial_neural_network&printable=yes>, (Accessed Sep. 24, 2014), 11 pgs.

(Continued)

*Primary Examiner* — Wilbert L Starks
(74) *Attorney, Agent, or Firm* — Schwegman Lundberg & Woessner, P.A.

(57) ABSTRACT

Example systems and methods of developing a learning model are presented. In one example, a sample data set to train a first learning algorithm is accessed. A number of states for each input of the sample data set is determined. A subset of the inputs is selected, and the sample data set is partitioned into a number of partitions equal to a combined number of states of the selected inputs. A second learning algorithm is created for each of the partitions, wherein each second learning algorithm receives the unselected inputs. Each of the second learning algorithms is assigned to a processor and trained using the samples of the partition corresponding to that algorithm. Decision logic is generated to direct each of a plurality of operational data units as input to one of the second learning algorithms based on states of the selected inputs of the operational data unit.

20 Claims, 10 Drawing Sheets

(56) References Cited

OTHER PUBLICATIONS

"Supervised Learning", Wikipedia, [Online]. Retrieved from the Internet: <URL: http://en.wikipedia.org/w/index.php?title=Supervised_learning&printable=yes>, (Accessed Sep. 26, 2014), 9 pgs.

"European Application Serial No. 15003445.2, Extended European Search Report dated Feb. 15, 2016", 14 pgs.

Estevez, Pablo, et al., "A scalable parallel algorithm for training a hierarchical mixture of neural experts", Parallel Computing 28, (Mar. 15, 2002), 861-891.

Freitas, Alex, "PKDD '98 Tutorial on Scalable, High-Performance Data Mining with Parallel Processing", Federal Center of Technological Education, [Online]. Retrieved from the Internet: <URL: http://citeseerx.ist.psu.edu/viewdoc/download?doi=10.1.1.27.1843&rep=rep1&type=ps>, (Sep. 1, 1998), 72 pgs.

Gordon, V Scott, et al., "Self-Splitting Modular Neural Network—Domain Partitioning at Boundaries of Trained Regions", International Joint Conference on Neural Networks, (2008), 1085-1091.

Karsoliya, Saurabh, "Approximating Number of Hidden layer neurons in Multiple Hidden Layer BPNN Architecture", International Journal of Engineering Trends and Technology. vol. 3, No. 6, [Online]. Retrieved from the Internet: <URL: http://www.ijettjournal.com/volume-3/issue-6/iJETT-V3I6P206.pdf>, (Dec. 1, 2012), 714-717.

Talia, Domenico, "Parallelism in Knowledge Discovery Techniques", Correct System Design, vol. 2367, (Jul. 4, 2002), 127-136.

\* cited by examiner

PARALLEL DEVELOPMENT AND DEPLOYMENT FOR MACHINE LEARNING MODELS

FIELD

This application relates generally to the field of data processing and, in an example embodiment, to parallel development and deployment of machine learning models or algorithms on multiple processors.

BACKGROUND

Machine learning models are widely employed to process large amounts of input data to generate or extract information of interest therefrom, such as, for example, descriptive or predictive information. Example uses for machine learning models include, for example, data mining, pattern recognition, "spam" identification, audio transcription, and so on.

Generally, a machine learning model may be a supervised learning model or an unsupervised learning model. A supervised learning algorithm or model is an algorithm that is initially trained using a training or sample data set, in which each sample specifies one or more input values and one or more output values that are caused or produced by the input values. Such data samples are typically termed "labeled" data samples due to the explicit association of the output values with the input values of the samples. Once the supervised learning algorithm has been trained by processing the sample data set, operational data, in which the resulting output value for each of the one or more outputs is currently unknown, is then provided as input to the trained algorithm to generate the one or more output values for each operational data unit. Types of supervised learning models may include, but are not limited to, artificial neural networks (ANNs), Bayesian networks, and symbolic machine learning algorithms.

In unsupervised learning models, the training data is "unlabeled," such that an explicit label or output value is not associated with any of the training data samples. Instead, all observed values of the training data samples may be presumed to be caused by a set of hidden or "latent" variables or values. However, both input and output variables or values may be provided to an unsupervised learning algorithm as observed values to determine a relationship between the inputs and outputs, even though the inputs are not considered in an unsupervised learning algorithm to cause or produce the outputs. Generally, in operation after the training phase, unsupervised learning models are employed to discover hidden structures or key features of operational data, or cluster together similar instances of operational data. Types of unsupervised learning models may include some ANNs, vector quantization algorithms, cluster analysis algorithms, and outlier detection algorithms.

Hybrid approaches, such as semi-supervised learning models or algorithms, may employ both labeled and unlabeled data for training purposes. In such models, a relatively large amount of unlabeled data and a relatively small amount of labeled data are often employed during the training phase.

More recently, both training data sets and operational data units for typical machine learning algorithms have greatly increased in size, causing the overall processing time for development and deployment of such models using these large data sets to increase significantly.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that exemplify illustrative embodiments. In the following description, for purposes of explanation, numerous specific details are set forth to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Figure 1:
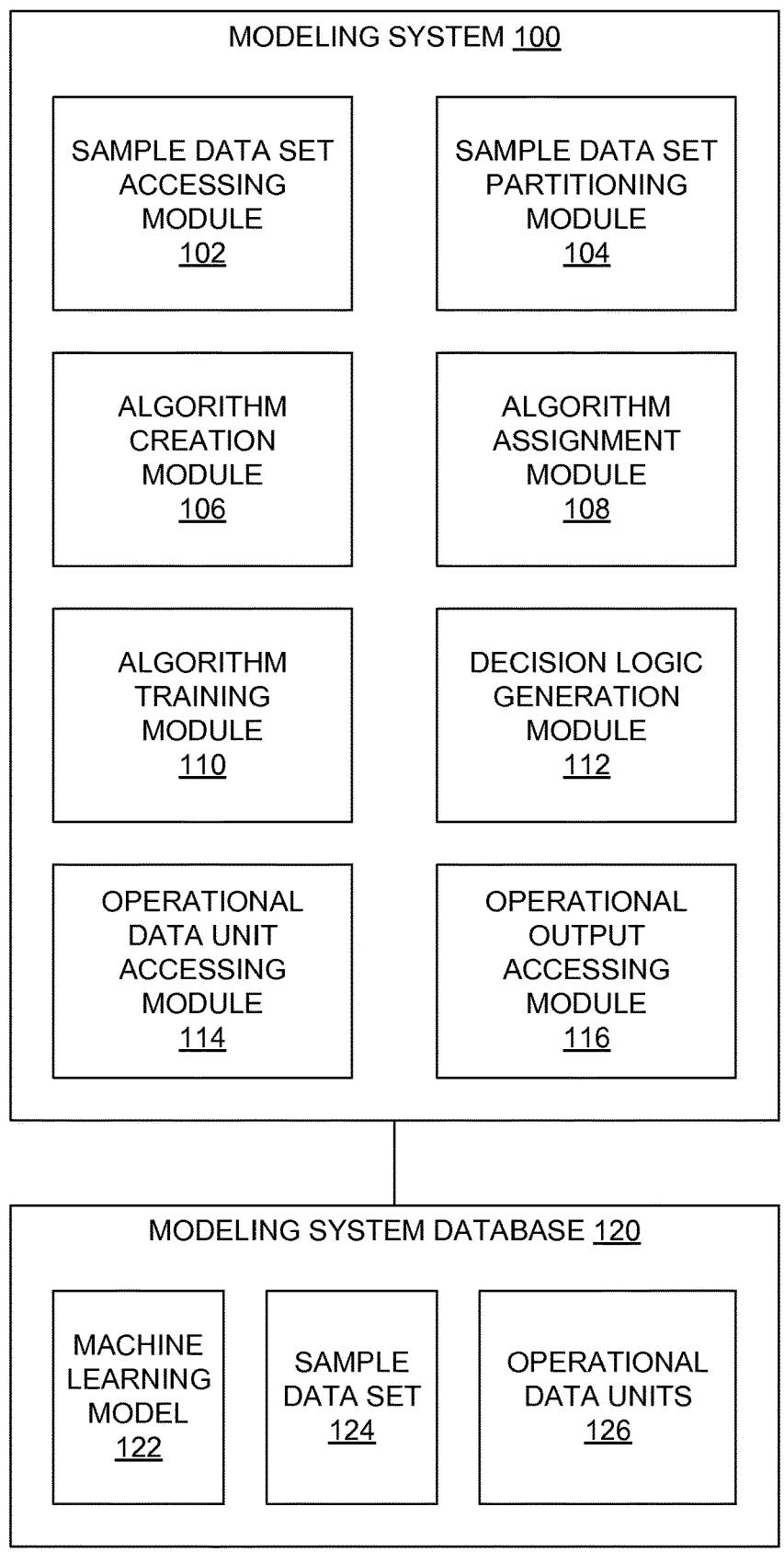
FIG. 1 is a block diagram illustrating an example modeling system.

FIG. 1 is a block diagram of an example modeling system 100 configured to develop and deploy a machine learning model or algorithm on multiple processors. In this example, the modeling system 100 includes a sample data set accessing module 102, a sample data set partitioning module 104, an algorithm creation module 106, an algorithm assignment module 108, an algorithm training module 110, a decision logic generation module 112, an operational data unit accessing module 114, and an operational output accessing module 116. Each of the modules 102-116 may be implemented exclusively in hardware, or in some combination of hardware and software or firmware executed on a hardware processor. Other modules, such as, for example, a user interface, a communication interface, a power supply, and the like, may also be employed in the modeling system 100, but are not depicted or described herein to simplify and focus the following discussion. Further, one or more of the modules 102-116 illustrated in FIG. 1 may be combined to create larger modules, be subdivided into multiple modules, or otherwise modified.

As is described in greater detail below, the modeling system 100 of FIG. 1 may generate multiple learning algorithms from the learning algorithm to be developed and deployed. Each of the generated algorithms may then be trained and deployed on a plurality of processors, thus facilitating parallel operation of the generated algorithms during both the training and deployment phases. Other aspects of the various embodiments are discussed in greater detail below. While much of the following discussion involves the use of supervised learning algorithms and, more specifically, ANNs, other types of machine learning models or algorithms, including unsupervised learning algorithms, may also be developed and deployed in other embodiments.

Continuing with FIG. 1, the sample data set accessing module 102 may be configured to receive, retrieve, or otherwise access samples of a sample data set 124 stored in a modeling system database 120 for training a machine learning model 122. In the case of a supervised machine learning algorithm, each sample of the sample data set 124 may provide a value for each of a number of inputs and a number of outputs of the machine learning model 122, with the outputs possibly defining a "label" that the machine learning model 122 may use to update or train the machine learning model 122 so that the model 122 will produce similar outputs for similar inputs received during the operational phase. Within the unsupervised learning algorithm context, each sample of the sample data set 124 may also include input and output values, but the machine learning model 122 may presume the values are generated based on latent or hidden variables or values within the model 122.

The modeling system database 120 is configured to store the sample data set 124, the machine learning model 122, and/or operational data units 126 that are provided to a trained version of the machine learning model 122 during normal operations. In some examples, the generated learning algorithms, the outputs of those algorithms, and other information described herein may also be stored in the modeling system database 120. Also, in some embodiments, the machine learning model 122, the sample data set 124, the operational data units 126, and/or other data described herein may be stored in separate data storage devices or systems. As depicted in FIG. 1, the modeling system database 120 is separate from, but communicatively coupled to, the modeling system 100, such as by way of a wide area network (WAN) (e.g., the Internet), a wired or wireless local area network (LAN) (e.g., an Ethernet network, a Wi-Fi® network, and so on), a cellular network (e.g., a third-generation (3G) or fourth-generation (4G) network), a storage area network (SAN), or other network or communication connection. In other embodiments, the modeling system database 120 may be incorporated within the modeling system 100. The modeling system database 120 may be configured to operate as a relational database or other type of database capable of receiving queries and generating associated responses. In other examples, the modeling system database 120 may operate as a data storage repository involving writing and reading of data blocks, sectors, or the like.

The sample data set partitioning module 104 may be configured to partition the sample data set 124 into a number of partitions, wherein each of the partitions is to be employed to train a corresponding one of the generated learning algorithms. To perform the partitioning, the sample data set partitioning module 104 may determine a number of states for each of the inputs reflected in the sample data set 124 and select a subset of the inputs. The sample data set partitioning module 104 may then partition the sample data set 124 into a number of partitions equal to the combined number of states of the selected inputs. Examples regarding the selection of the inputs, including considerations related thereto, are discussed in greater detail below.

The algorithm creation module 106 may be configured to generate a plurality of learning algorithms, wherein each of the generated learning algorithms corresponds to one of the partitions of the sample data set 124. Consequently, each of the generated learning algorithms may correspond to one of the combined states of the inputs selected in the sample data set partitioning module 104. In one example, the algorithm creation module 106 may create or generate a particular learning algorithm by presuming that the selected inputs provided to the generated algorithm are always set to the combined state corresponding to the algorithm being generated, thus simplifying the original machine learning model.

The algorithm assignment module 108 may be configured to assign each of the generated learning algorithms to one of a plurality of processors of a computing system. In one example, the combined number of states of the selected inputs, as selected by the sample data set partitioning module 104, is a greatest whole number less than or equal to the number of available processors. Accordingly, all of the generated learning algorithms may be executed in parallel, while employing all or less than all of the available processors of the computing system. In another example, the combined number of states of the selected inputs is a least whole number greater than or equal to the number of available processors. In this case, the processing power will be maximized, with possibly more than one learning algorithm being developed and/or deployed using the same processor. Further, the processors may be processors located within the same computing device or machine, or may be distributed across multiple computing devices or machines, such as those that may be communicatively coupled via a communication network. Also, each processor may be a microprocessor, microcontroller, or any other hardware-based processor configured to execute at least one learning algorithm for purposes of training and/or operation.

The algorithm training module 110 may be configured to train each of the generated learning algorithms on its assigned processor using the samples of the corresponding partition of the sample data set 124. In one example, the algorithm training module 110 may serve as a type of supervisory module that distributes each of the samples of a particular partition to its associated generated learning algorithm being executed at a particular processor. In another example, the algorithm training module 110 may be distributed among the processors tasked with training and/or operating the generated algorithms such that the instance of the algorithm training module 110 executing on a particular processor accesses, via the sample data set accessing module 102, the samples of the sample data set 124 from the partition associated with the generated learning algorithm executing on that processor.

The decision logic generation module 112 may be configured to generate decision logic that directs each of a plurality of the operational data units 126 as input to a corresponding one of the generated learning algorithms based on a state of the selected inputs represented in each of the operational data units 126. As indicated above with respect to the algorithm training module 110, the generated decision logic may function as a type of supervisory module that distributes each of the operation data units 126 associated with a particular partition to its corresponding generated learning algorithm being executed at a particular processor. In another example, the generated decision logic may be distributed among the processors tasked with operating the generated algorithms such that the instance or portion of the decision logic executing on a particular processor accesses those operational data units 126 that are associated with the generated learning algorithm executing on that processor. Accordingly, in some examples, the algorithm training module 110 and the decision logic generation module 112 may share processing logic, or may be incorporated within the same module.

The operational data unit accessing module 114 may be configured to access the operational data units 126 and provide each of the operational data units 126 to the decision logic generated by the decision logic generation module 112 for execution by a corresponding one of the generated learning algorithms. As with the sample data set 124, the operational data units 126 may be retrieved or accessed from the modeling system database 120. In some examples, the operational data units 126 may be accessed in a chronological order based on the time upon which the operational data units 126 were generated, such as by way of time-based observation of user behavior, computing system behavior, and the like. In other examples, each of the operational data units 126 may be accessed without reference to any particular point in time.

The operational output accessing module 116 may be configured to access, for each operational data unit 126, the one or more outputs generated by the generated learning algorithm that processed the corresponding operational data unit 126. In some examples, the operational output accessing module 116 may store the resulting outputs in the modeling system database 120, provide the outputs to a processing system for analysis, and/or so on. As mentioned above, the resulting outputs may represent or provide descriptive information, predictive information, or other information of interest regarding pattern recognition, audio transcription, data mining, and/or myriad other applications, depending on the nature of the operational data units 126 and the machine learning model 122 employed.

Figure 2:
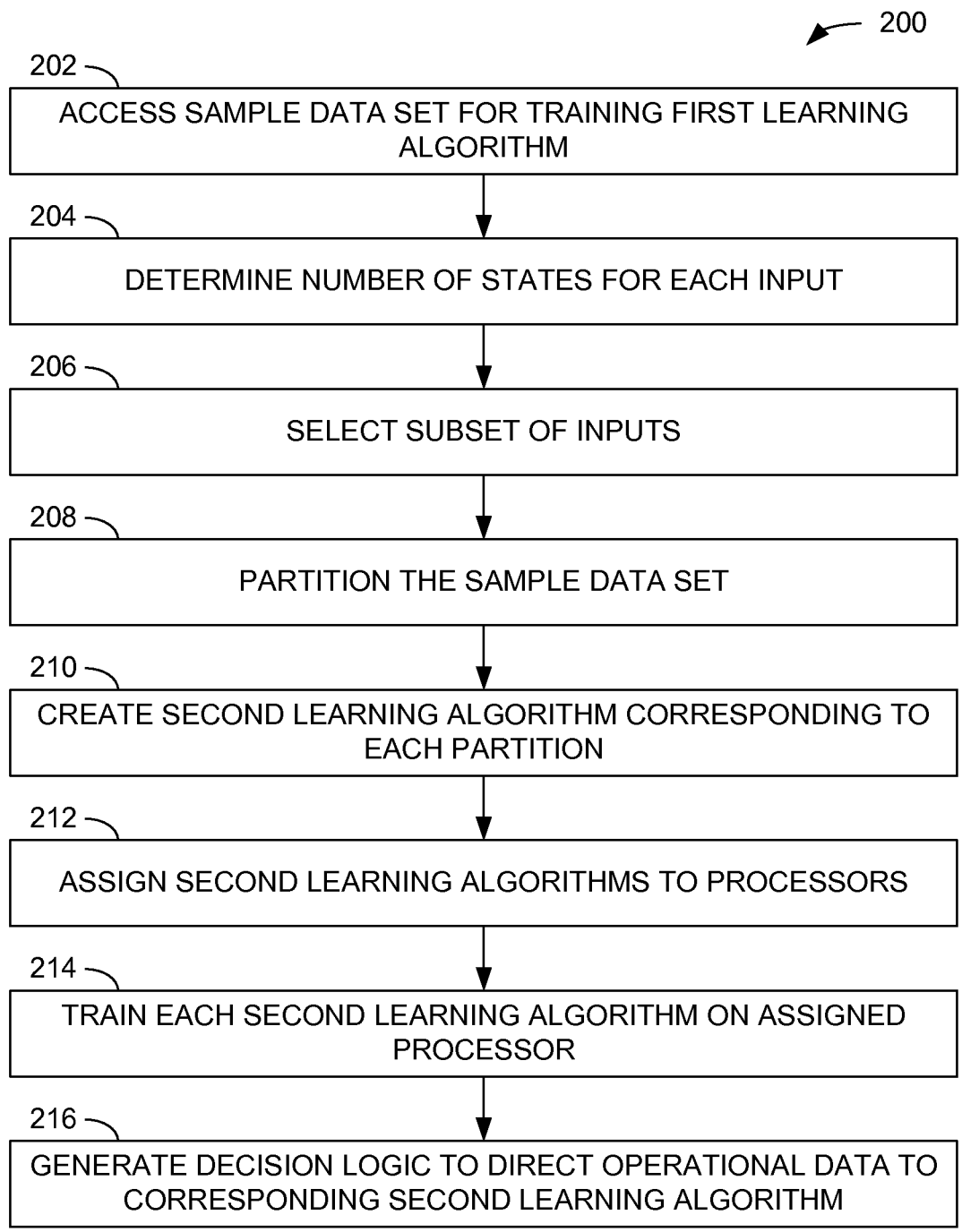
FIG. 2 is a flow diagram illustrating an example method of developing a machine learning model by employing multiple processors.

FIG. 2 is a flow diagram illustrating an example method 200 of developing a machine learning model (e.g., the machine learning model 122 of FIG. 1) by employing multiple processors. In one example, the modeling system 100 of FIG. 1 and, more specifically, the various modules 102-116 incorporated therein, are described below as performing the operations of the method 200. However, other devices or systems not specifically described herein may perform the method 200 in other implementations.

In the method 200, presuming the use of the modeling system 100 of FIG. 1, the sample data set accessing module 102 may access a sample data set (e.g., sample data set 124 of FIG. 1) for training a first learning algorithm (e.g., machine learning model 122 of FIG. 1) (operation 202). The sample data set partitioning module 104 may determine the number of states for each input of the sample data set 124 (operation 204), select a subset of the inputs (operation 206), and partition the sample data set 124 (operation 208) into a number of partitions equal to a combined number of states of the selected inputs. The algorithm creation module 106 may create or generate a second learning algorithm (e.g., generated learning algorithms, as discussed above) corresponding to each partition (operation 210). The algorithm assignment module 108 may assign each of the second learning algorithms to a processor of a computing system (operation 212). The algorithm training module 110 may train each of the second learning algorithms on its assigned processor (operation 214). The decision logic generation module 112 may generate decision logic to direct each operational data unit (e.g., the operational data units 126 of FIG. 1) to its corresponding second learning algorithm (operation 216).

Figure 3:
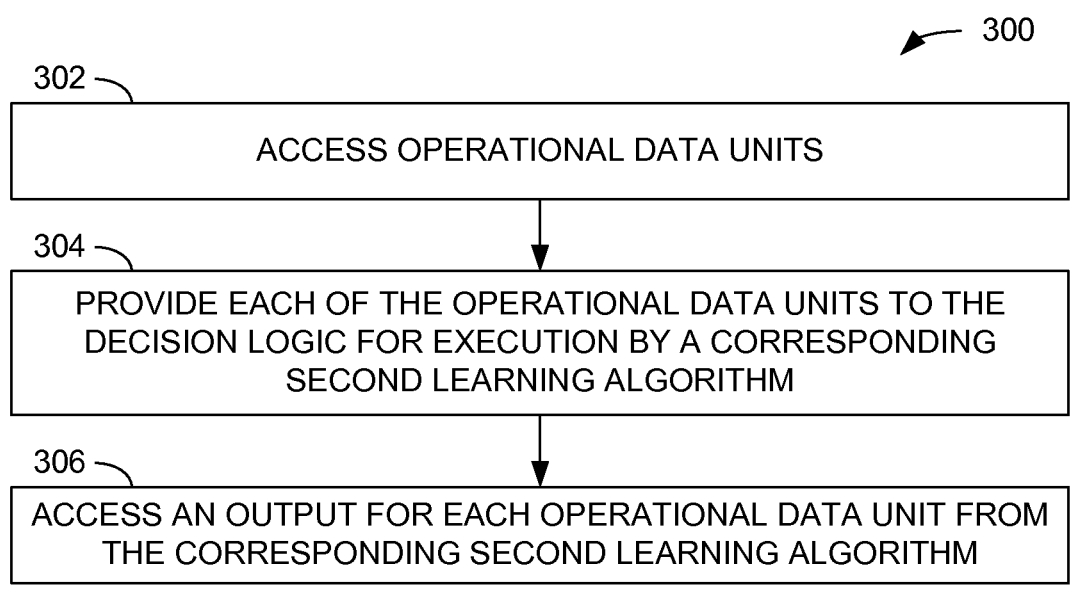
FIG. 3 is a flow diagram illustrating an example method of deploying a machine learning model employing multiple processors.

After the development and training of the first learning algorithm, as represented by the multiple second learning algorithms, operational use of the first learning algorithm via the second learning algorithms may begin. To that end, FIG. 3 is a flow diagram illustrating an example method 300 of deploying the machine learning model 122 on the multiple processors using the second learning algorithms. In the method 300, the operational data unit accessing module 114 may access the operation data units 126 (operation 302) and provide each of the operational data units 126 accessed to the decision logic generated via method 200 for execution by a corresponding second learning algorithm on an associated processor (operation 304). The operational output accessing module 116 may access one or more outputs for each operational data unit 126 from the corresponding second learning algorithm (operation 306).

FIG. 2 substantially depicts the operations 202-216 of the method 200 as being executed serially in a particular order. Similarly, FIG. 3 depicts operations 302-306 of method 300 as being executed serially as well. However, other orders of execution, including parallel or concurrent execution of one or more of the operations 202-216 and 302-306, as well as other method operations described herein, are possible. For example, the training of the second learning algorithms (operation 214) and the generation of the decision logic (operation 216) of method 200 may occur in any order, and may also be performed in parallel or tandem. In another example, the access of the operation data units 126 (operation 302), the providing of the operational data units 126 to their respective second learning algorithms (operation 304), and the access of the one or more outputs corresponding to each operational data unit 126 (operation 306) may be performed in parallel on different operational data units 126 on an ongoing basis as the operational data units 126 become available. Other examples of various orders of execution of the operations 202-216 and 302-306 are also possible in other implementations.

Figure 4:
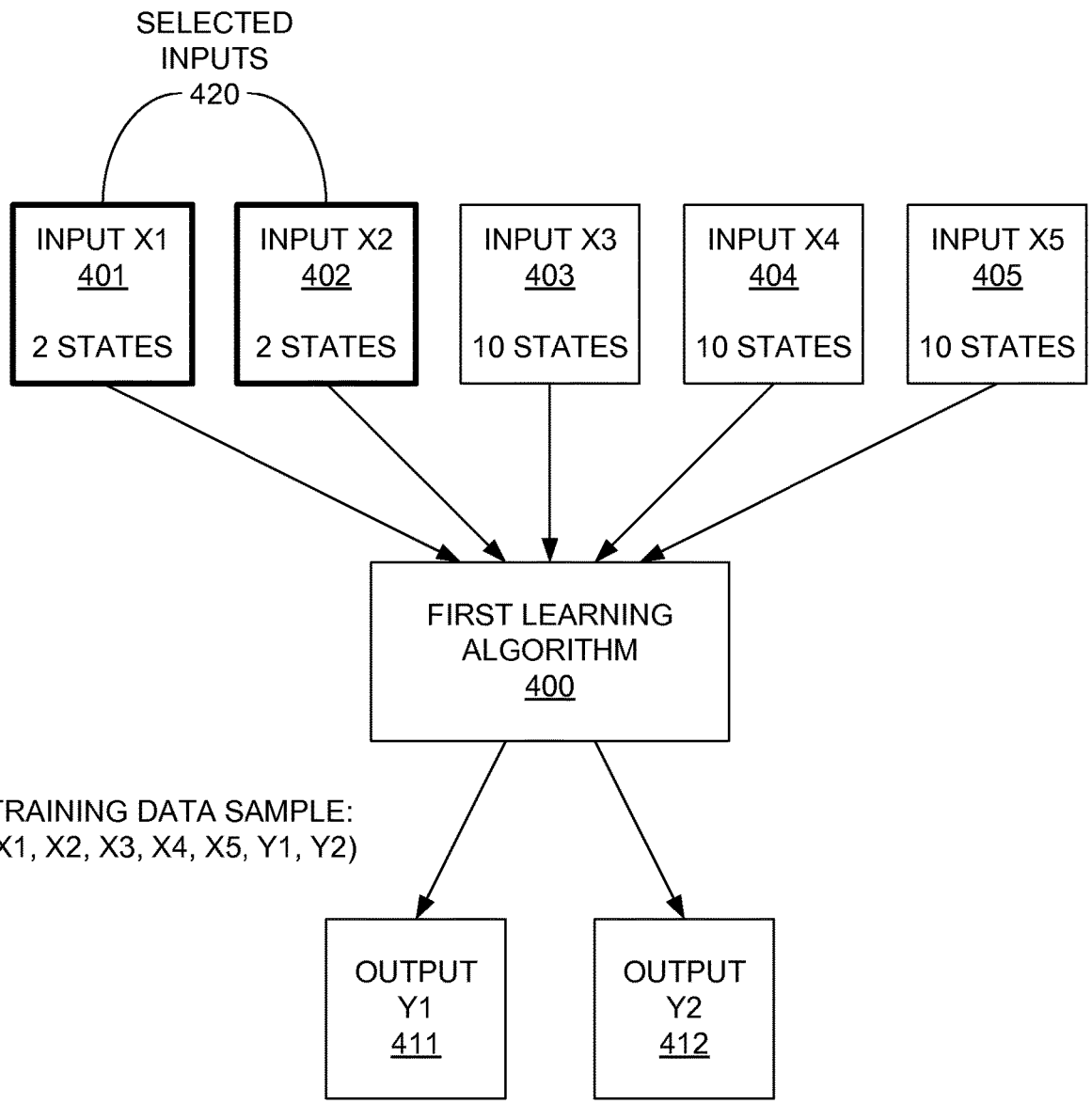
FIG. 4 is a block diagram illustrating an example first learning algorithm having a number of inputs and outputs.
Figure 5:
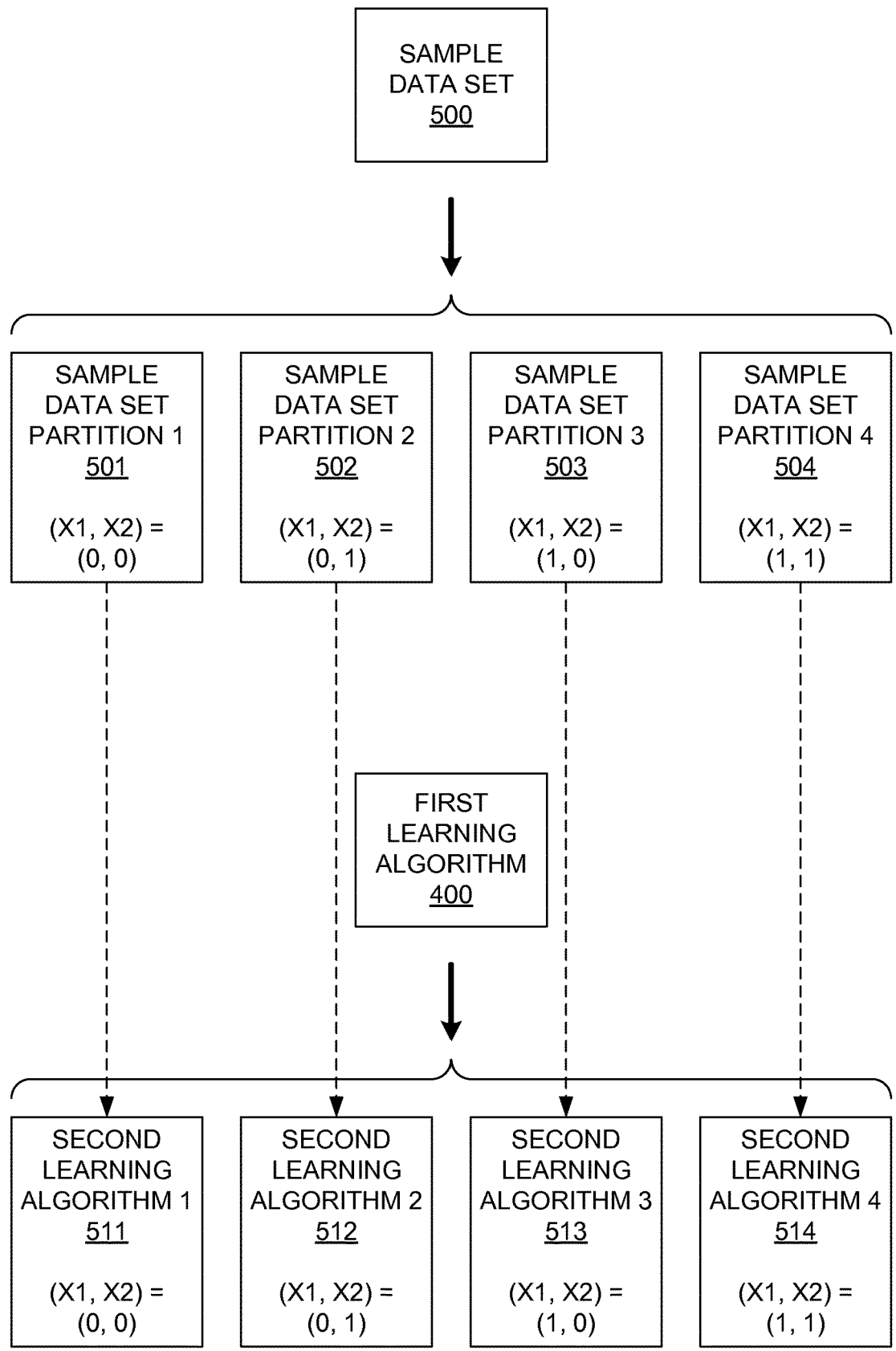
FIG. 5 is a block diagram of a sample data set separated into a number of partitions, and multiple second learning algorithms created from the example first learning algorithm of FIG. 4.
Figure 6:
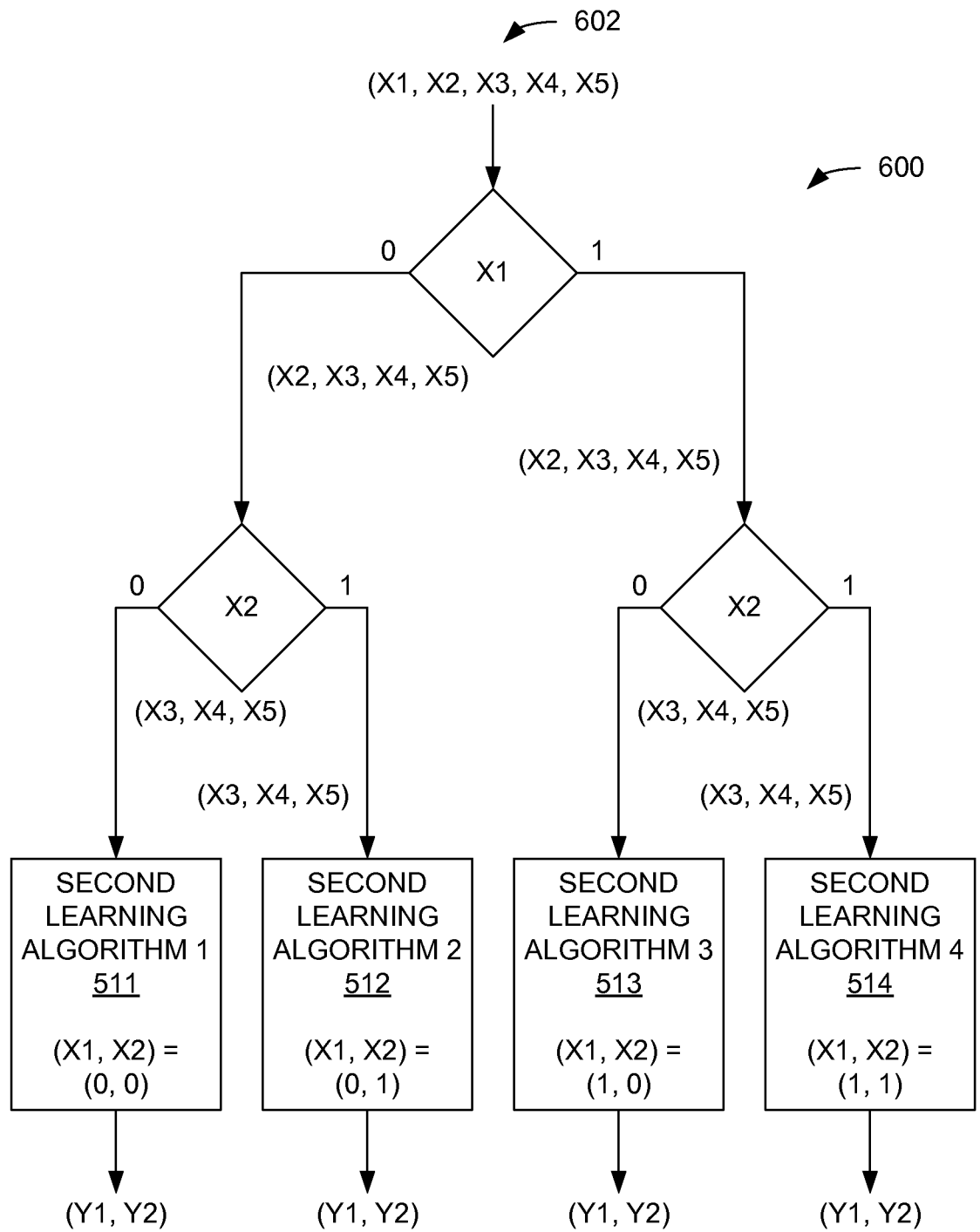
FIG. 6 is a block diagram representing example decision logic to direct each operational data unit to a corresponding second learning algorithm.

FIGS. 4, 5, and 6 illustrate various aspects of the operation of the modeling system 100 of FIG. 1, as well as the methods 200 and 300 of FIGS. 2 and 3, respectively, for a particular example of a first learning algorithm 400 representing the machine learning model 122 of FIG. 1. As illustrated in FIG. 4, the first learning algorithm 400 receives five inputs: X1 (401), X2 (402), X3 (403), X4 (404), and X5 (405). In processing the five inputs, the first learning algorithm 400 produces two outputs: Y1 (411) and Y2 (412). During normal operation, the first learning algorithm 400 may receive multiple operational data units 126 that provide a value for each of the inputs X1-X5 (401-405), and may produce values for outputs Y1, Y2 (411, 412) for each of the operational data units 126. The input and/or output values may be numerical (e.g., whole numbers, fractional numbers, floating-point numbers, etc.), Boolean (e.g., yes/no, true/false, etc.), alphabetical (e.g., A, B, C, etc.), or any other value that may be represented and/or processed by the first learning algorithm 400.

To train the first learning algorithm 400, a sample data set (e.g., sample data set 124 of FIG. 1) may be provided. Each sample of the sample data set 124 may include both the inputs X1-X5 (401-405) of a presumed operational data unit 126, as well as the expected or desired outputs Y1, Y2 (411, 412) for that operational data unit 126. Thus, each sample may be represented as the ordered set (X1, X2, X3, X4, X5, Y1, Y2), as depicted in FIG. 4. In some examples, the sample data set 124 may be derived from results of previously employed machine learning algorithms, from results desired by designers of the first learning algorithm 400, and/or by way of other mechanisms.

The value of each of the inputs X1-X5 (401-405) may represent one of a possible number of states. As shown in FIG. 4, over the entirety of the sample data set 124, the inputs X1 (401) observed may represent two different values or states (e.g., 0/1, true/false, etc.). Similarly, input X2 (402) may also have two possible states, while each of inputs X3 (403), X4 (404), and X5 (405) may possess ten possible states (e.g., digits 0-9). In other examples, any number of states may be associated with each of a number of inputs of a machine learning model.

As indicated above, the sample data set partitioning module 104 may select one or more of the inputs X1-X5 (401-405) to partition the sample data set 124 into a number of partitions equal to the combined states of the selected inputs 420. In this particular example, the sample data set partitioning module 104 has selected inputs X1 (401) and X2 (402), resulting in four combined states for those inputs, based on the two states of input X1 (401) multiplied by the two states of input X2 (402). If, instead, the sample data set partitioning module 104 had selected input X2 (402) and input X4 (404), the number of combined states may be two (the number of states of X2 (402)) multiplied by ten (the number of states of X4 (404)), resulting in twenty combined states. While each of these examples involves the selection of two inputs, any number of inputs, from one to the total number of inputs of each sample of the sample data set 124, may be selected to form the partitions.

In this example, the sample data set partitioning module 104 may be configured to select inputs X1 (401) and X2 (402) based on the availability of four separate processors or processing units in a computing system. As a result, each of the partitions may be processed in parallel on a separate processor executing a corresponding second learning algorithm, as discussed below in conjunction with FIG. 5. In another example, if ten processors are available, the sample data set partitioning module 104 may instead select one of inputs X3-X5 (403-405) as a basis for partitioning the sample data set 124 into ten partitions. In yet other embodiments described more fully below, the possible number of combined states of any selected inputs 420 may not precisely match the number of available processors.

FIG. 5 is a block diagram of a sample data set 500 separated into a number of partitions 501-504, and multiple second learning algorithms 511-514 created from the example first learning algorithm 400 of FIG. 4, based on the selected inputs X1 (401) and X2 (402). In this example, each of the four combined states of the selected inputs X1 (401) and X2 (402) corresponds to a particular partition 501-504. More specifically, presuming that the combined state of the selected inputs X1 (401) and X2 (402) is represented as the ordered set (X1, X2), then partition 1 (501) of the sample data set 500 corresponds to combined state (0, 0), partition 2 (502) corresponds to combined state (0, 1), partition 3 (503) corresponds to combined state (1, 0), and partition 4 (504) corresponds to combined state (1, 1). Accordingly, the sample data set partitioning module 104 may assign all samples of the sample data set 501 with values X1 (401)=0 and X2 (402)=0 to partition 1 (501), assign all samples of the sample data set 501 with values X1 (401)=0 and X2 (402)=1 to partition 2 (502), and so on.

Given the sample data set partitions 501-504, as illustrated in FIG. 5, the algorithm creation module 106, using the first learning algorithm 400, may generate a second learning algorithm 511-514 corresponding to each of the sample data set partitions 501-504. More specifically, second learning algorithm 1 (511) may be configured to receive and process all sample data units of partition 1 (501) for training. Similarly, second learning algorithm 2 (512) may be configured to receive and process all sample data units of partition 2 (502), second learning algorithm 3 (513) may be configured to receive and process all sample data units of partition 3 (503), and second learning algorithm 4 (514) may be configured to receive and process all sample data units of partition 4 (504).

As a result, each of the second learning algorithms 511-514 receives samples from the sample data set 500 (and, later, operational data units) in which the selected inputs X1 (401) and X2 (402) are always the same values. For example, all input values received at the second learning algorithm 3 (513) have X1 (401)=1 and X2 (402)=0. Consequently, the algorithm creation module 106 may generate the second learning algorithm 2 (513) by beginning with the first learning algorithm 400 and streamlining or reducing portions of the algorithm which test the state of the selected inputs X1 (401) and X2 (402), as well as those portions which are executed when the state of the selected inputs is other than X1 (401)=1 and X2 (402)=0. The algorithm creation module 106 may generate each of the remaining second learning algorithms 511, 512, and 514 based on the state of the selected inputs X1 (401) and X2 (402) corresponding to those second learning algorithms 511, 512, and 514.

Presuming the availability of four processors or processing units, as suggested above, the algorithm assignment module 108 of FIG. 1 may then assign each of the generated second learning algorithms 511-514 to a processor or processing unit of a computing system so that each of the second learning algorithms 511-514 may be trained by the algorithm training module 110 using the samples of its corresponding sample data set partition 501-504, as depicted in FIG. 5.

Once each of the second learning algorithms 511-514 has been trained using the samples of the corresponding sample data set partition 501-504, the second learning algorithms 511-514 may be employed to receive and process operational data units 126, thus generating values for outputs Y1 (411) and Y2 (412) for each operational data unit 126 for which each of the second learning algorithms 511-514 is responsible. To facilitate these operations, the decision logic generation module 112 may generate decision logic that directs each of the operational data units 126 to its corresponding second learning algorithm 511-514 based on the state of the selected inputs 420 corresponding to the second learning algorithm 511-514.

FIG. 6 is a block diagram representing example decision logic 600 to direct each operational data unit 602 to a corresponding second learning algorithm 511-514. In this particular example, the decision logic 600 is in the form of a decision tree that branches the operational data unit 602 based on the value of input X1 (401), and then subsequently branches the operational data unit 602 on the value of input X2 (402). As illustrated in FIG. 6, an operational data unit 602 to be processed exhibits values for each of the five inputs X1-X5 (401-405). Based on the value of X1 (401)=0, the remaining inputs X2-X5 (402-405) of the operational data unit 602 are directed to the left in FIG. 6; conversely, based on the value of X1 (401)=1, the remaining inputs X2-X5 (402-405) of the operational data unit 602 are instead directed to the right. In each case, the value of X2 (402) is then employed to branch the remaining set of inputs X3-X5 (403-405) to one of the four second learning algorithms 511-514.

Other examples of decision logic may be employed instead of the decision logic 600 of FIG. 6. For example, a decision tree in which the value of input X2 is tested first may be employed. In yet other embodiments, the decision logic 600 may be something other than a decision tree, such as, for example, a 2-to-4 decoder, a case statement, and/or other decision logic that directs each operational data unit 602 to a corresponding second learning algorithm 511-512 based on the combined state of the selected inputs X1 (401) and X2 (402).

After the decision logic 600 directs at least inputs X3-X5 (403-405) of a particular operational data unit 602 received by the operation data unit accessing module 114 to its corresponding second learning algorithm 511-514, the second learning algorithm 511-514 produces values for outputs Y1 (411) and Y2 (412) based on the received inputs X3-X5 (403-405). As described above, the operational output accessing module 116 may then subsequently store, forward, and/or process the outputs Y1 (411) and Y2 (412).

Figure 7:
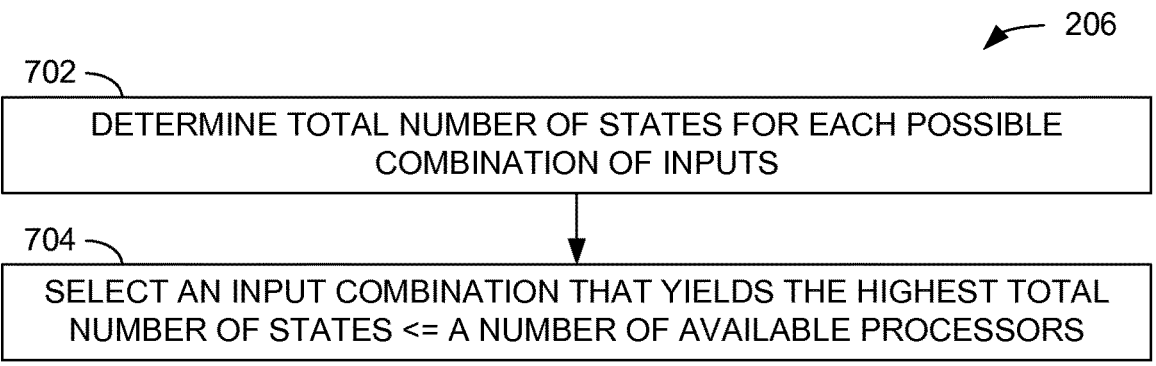
FIG. 7 is a flow diagram of an example method for selecting inputs such that the number of second learning algorithms is less than or equal to a number of processors.
Figure 8:
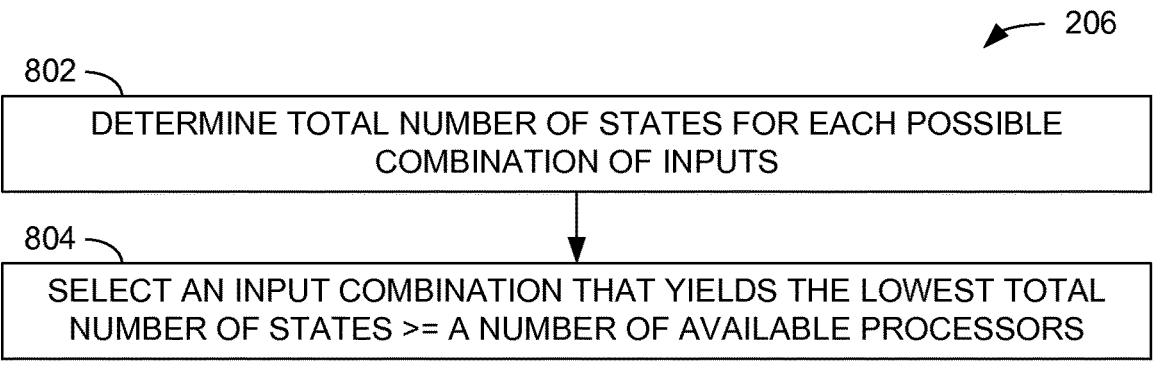
FIG. 8 is a flow diagram of an example method for selecting inputs such that the number of second learning algorithms is greater than or equal to a number of processors.

In the foregoing example, the sample data set partitioning module 104 determined a set of inputs (e.g., X1 (401) and X2 (402)) whose combined number of states (e.g., four) was equal to the number of processors of a computing system available for both training and normal operation of the generated second learning algorithms 511-514. In other examples, however, the number of available processors may not be equal to any of the combined number of states that result from any particular selection of inputs. FIGS. 7 and 8 depict methods that address such a possibility.

FIG. 7, for instance, is a flow diagram of an example method for selecting inputs (e.g., operation 206 of the method 200 of FIG. 2) such that the number of second learning algorithms 511-514 is less than or equal to a number of processors. In this method, the sample data set partitioning module 104 may determine a total number of states for each possible combination of inputs to be selected (operation 702). For example, in the embodiment of FIG. 4, the sample data set partitioning module 104 may determine the number of states for each of the inputs X1-X5 (401-405) separately, the number of states of each pair of the inputs X1-X5 (401-405), each set of three of the inputs X1-X5 (401-405), followed by each set of four of the inputs X1-X5 (401-405), and possibly followed by the combined states of all five inputs X1-X5 (401-405).

The sample data set partitioning module 104 may then select an input combination that yields the highest total number of states that is less than or equal to a number of available processors or processing units (operation 704). For example, if the number of available processors is five, the sample data set partitioning module 104 may select an input combination that yields four combined input states if no input combination yields exactly five states. In such an example, the sample data set partitioning module 104 may allow one or more processors to remain idle while facilitating the training and operation of the second learning algorithms 511-514 to proceed in parallel fashion.

In other embodiments, the sample data set partitioning module 104 may instead be configured to employ all available processors or processing units for training and operational purposes, even if two or more of the second learning algorithms 511-514 are assigned to the same processor. To that end, FIG. 8 is a flow diagram of an example method (e.g., operation 206 of the method 200 of FIG. 2) for selecting inputs such that the number of second learning algorithms 511-514 is greater than or equal to a number of processors. In this method, the sample data set partitioning module 104 may determine a total number of states for each possible combination of inputs to be selected (operation 802), as described above in conjunction with operation 702 of FIG. 7. The sample data set partitioning module 104 may then select an input combination that yields the lowest total number of states that is greater than or equal to a number of available processors or processing units (operation 804). For example, if the number of available processors is five, the sample data set partitioning module 104 may select an input combination that yields six combined input states if no input combination yields exactly five states. Consequently, the sample data set partitioning module 104 may thus help ensure that each of the available processors employs at least one second learning algorithm 511-514 to maximize use of the processors. During the training phase in such examples, the algorithm training module 110 may train one of the second learning algorithms 511-514 on a processor, and train another of the second learning algorithms 511-514 on the same processor thereafter. Accordingly, in some embodiments, the algorithm training module 110 may determine the number of samples associated with each of the partitions 501-504, and select smaller ones of the partitions 501-504 for training on the same processor or processing unit.

Figure 9:
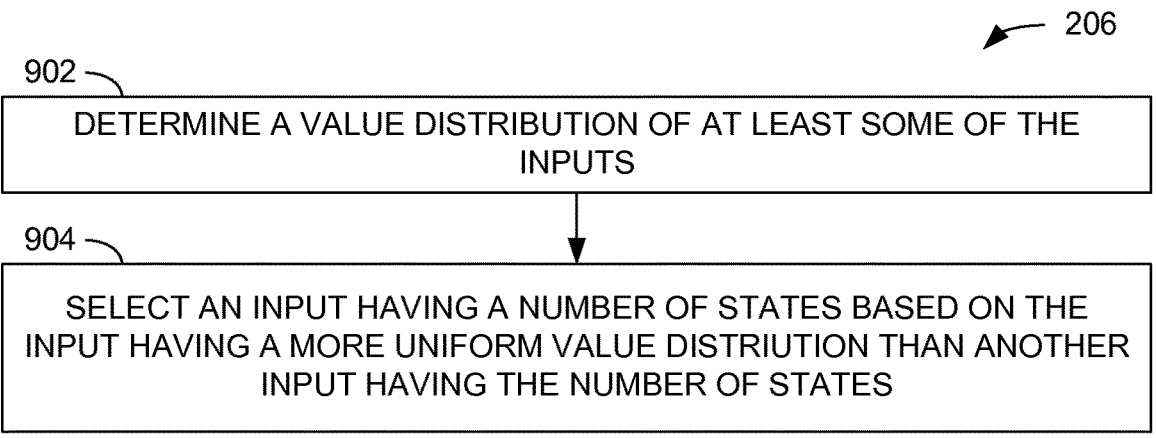
FIG. 9 is a flow diagram of an example method for selecting a particular input based on the input having a more uniform value distribution among the states of the input compared to another input having the same number of states.

In some examples, the algorithm training module 110 may base its input selection on a value distribution of at least some of the inputs X1-X5 (401-405). FIG. 9 is a flow diagram of an example method (e.g., operation 206 of FIG. 2) for selecting a particular input X1-X5 (401-405) based on the input having a more uniform value distribution among the states of the input compared to another input having the same number of states. In this particular method, the algorithm training module 110 may determine a value distribution of at least some of the inputs X1-X5 (401-405) indicated in the sample data set 500 (operation 902). Based on one input having a more uniform value distribution than another input having the same number of states, the algorithm training module 110 may select the input having the more uniform value distribution (operation 904). For example, a first input may have two possible states, with a first state occurring in 30 percent of the sample data set 500 and a second state occurring in the remaining 70 percent of the sample data set. A second input may also have two possible states, with a first state occurring in 45 percent of the sample data set 500 and a second state occurring in the remaining 55 percent of the sample data set 500. Under such circumstances, the algorithm training module 110 may select the second input over the first input so that the sample data set partitions 501-504 associated with each state of the selected (first) input may be relatively similar in size, thus allowing the associated second learning algorithms 511-514 to be trained in a similar amount of time on different processors.

Figure 10:
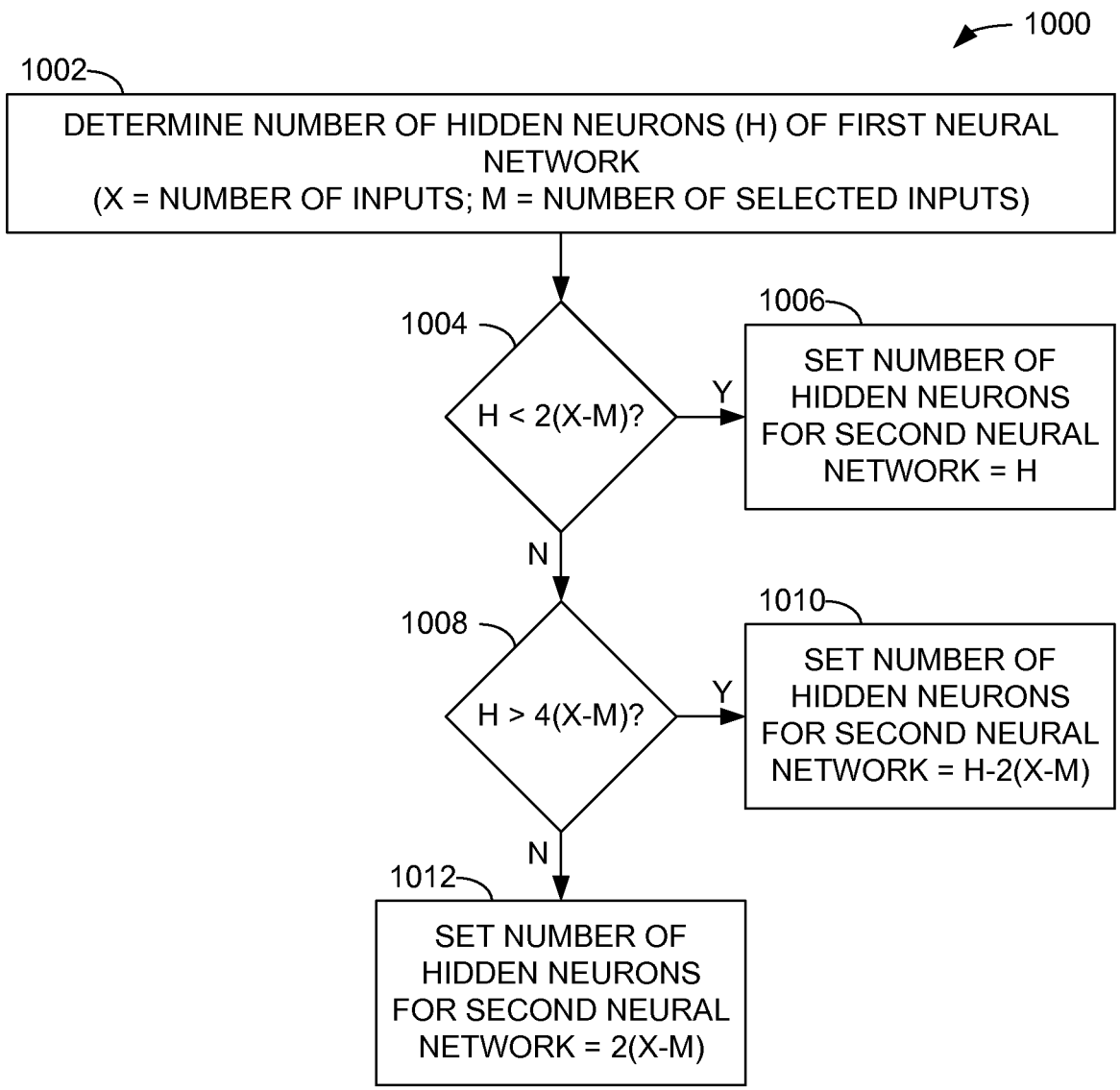
FIG. 10 is a flow diagram of an example method of determining a number of hidden neurons of at least one second neural network based on a number of hidden neurons of a first neural network serving as a first learning algorithm.

In embodiments in which the first learning algorithm 400 and the second learning algorithms 511-514 are ANNs, each of the ANNs may include "hidden" neurons that are located within the ANN between input neurons associated with inputs of the ANN and output neurons corresponding to outputs of the ANN. In at least some training and operational environments, performance may be improved if the number of hidden neurons is approximately twice the number of inputs X1-X5 (401-405). To maintain such a ratio, FIG. 10 provides a flow diagram of an example method 1000 of determining a number of hidden neurons of at least one second neural network based on a number of hidden neurons of a first neural network serving as the first learning algorithm 400.

In the method 1000, the algorithm creation module 106 may determine the number of hidden neurons (labeled "H" herein) of the first ANN serving as the first learning algorithm 400 (operation 1002). If the number of hidden neurons H is less than twice the number of inputs minus twice a number of the selected inputs (e.g., $H<2(X-M)$, wherein X is the number of inputs of each sample of the sample data set 500 and M is the number of selected inputs) (operation 1004), the algorithm creation module 106 may set a number of hidden neurons of at least one of the second ANNs (representing at least one of the second learning algorithms 511-514) equal to the number of hidden neurons H of the first ANN (operation 1006).

If, instead, the number of hidden neurons H is greater than four times the number of inputs minus four times the number of the selected inputs (e.g., $H>4(X-M)$) (operation 1008), the algorithm creation module 106 may set the number of hidden neurons of at least one of the second ANNs equal to the number of hidden neurons H of the first ANN minus twice the number of inputs, minus twice the number of selected inputs (e.g., $H-2(X-M)$) (operation 1010). Otherwise, the algorithm creation module 106 may set the number of hidden neurons of at least one of the second ANNs equal to twice the number of inputs minus twice the number of selected inputs (e.g., $2(X-M)$) (operation 1012).

Regarding the decision logic 600 for directing operational data units 602 to one of the second learning algorithms 511-514, one or more operational data units 602 may include a value for an input X1-X5 (401-405) that was not encountered in any samples of the sample data set 500 used to train the second learning algorithms 511-514. For example, the values of X1 (401) in the sample data set 500 may have only exhibited one of two states (e.g., 0 or 1). Further, the sample data set partitioning module 104 may have selected X1 (401) and X2 (402) by which to generate the partitions 501-504 and the corresponding second learning algorithms 511-514. However, during the operational phase, the operational data unit accessing module 114 may receive an operational data unit 602 in which the input X1 (401) exhibits a new, third state (e.g., 2). The modeling system 100 may address this possibility in a number of ways, depending on the particular embodiment.

For example, instead of determining the number of states of a particular input X1-X5 (401-405) based on the values of the inputs X1-X5 (401-405) observed in the samples of the sample data set 500, as discussed above, the sample data set partitioning module 104 may receive or possess information regarding the number of possible states of each input X1-X5 (401-405), regardless of whether each of the possible states is reflected in the sample data set 500. Consequently, the sample data set partitioning module 104 may select one or more of the inputs X1-X5 (401-405) based on those states, and then proceed to partition the sample data set 500 into multiple partitions 501-504 and generate the corresponding second learning algorithms 511-514, as discussed above. In such an example, if no operational data units 602 include a value of 2 for input X1, the corresponding second learning algorithm, and the processor to which it is assigned, may remain unused.

In another example, presuming the sample data set partitioning module 104 continues to determine the number of states of each input X1-X5 (401-405) based on the states actually observed in the sample data set 500, an operational data unit 602 that includes a previously unseen state for one of the selected inputs X1 (401) and X2 (402) may cause the decision logic generation module 112 and/or the operational data unit accessing module 114 to update or revise the decision logic 600 to employ one or more of the second learning algorithms 511-514 to process the operational data unit 602 despite none of the second learning algorithms 511-514 being generated explicitly to handle the newly encountered state of one of the selected inputs X1 (401) and X2 (402).

Figure 11:
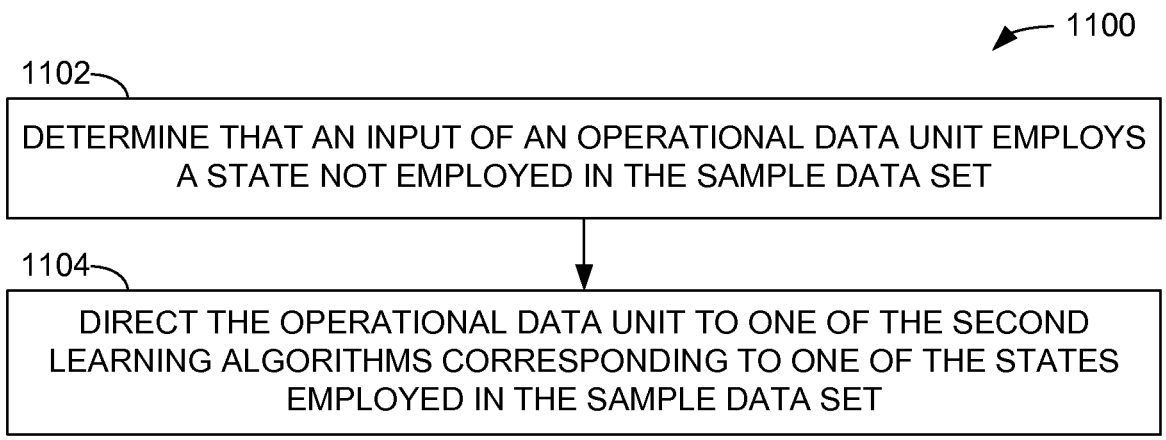
FIGS. 11 and 12 are flow diagrams of example methods of processing an operational data unit having a input state that is not employed in the sample data set.
Figure 12:
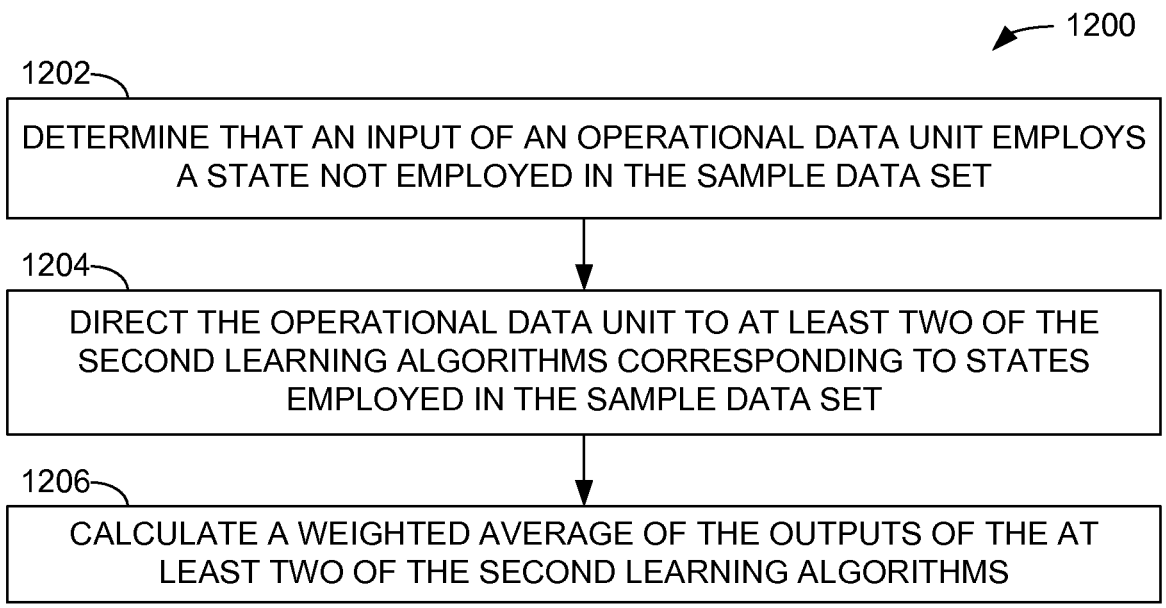

FIGS. 11 and 12 are flow diagrams of example methods 1100, 1200 of processing an operational data unit 602 having a state of an input that is not employed in the sample data set 500. In the method 1100 of FIG. 11, the operational data unit accessing module 114 may determine that an input of an operational data unit 602 employs an input state that is not used in the sample data set 500 (operation 1102). In response, the decision logic generation module 112 may configure the decision logic 600 to direct the operational data unit 602 as input to one of the second learning algorithms 511-514 corresponding to one of the input states employed in the sample data set 500 (operation 1104). Employing the example from above, presuming an operational data unit 602 includes a value of 2 for input X1 (401), the decision logic generation module 112 may configure the decision logic 600 to direct the operational data unit 602 to either one of the second learning algorithm 1 (511) or second learning algorithm 2 (512) (associated with input X1 (401)=0) or one of the second learning algorithm 3 (513) or the second learning algorithm 4 (514) (associated with input X1 (401)=1). The decision logic generation module 112 may determine which of the second learning algorithms 511-514 is to receive the operational data unit 602 under these circumstances based on a desired output associated with the new state of the input X1 (401) and/or other factors, or on which of the previously-detected states (e.g., 0 or 1) more closely represents the newly-detected state (e.g., 2) of input X1 (401).

In the method 1200 of FIG. 12, the operational data unit accessing module 114 may again determine that an input of an operational data unit 602 employs an input state that is not used in the sample data set 500 (operation 1202). In response, the decision logic generation module 112 may configure the decision logic 600 to direct the operational data unit 602 as input to two or more of the second learning algorithms 511-514 corresponding to two or more of the input states employed in the sample data set 500 (operation 1204). Employing the example from above, presuming an operational data unit 602 includes a value of 2 for input X1 (401), the decision logic generation module 112 may configure the decision logic 600 to direct the operational data unit 602 to both one of the second learning algorithm 1 (511) or second learning algorithm 2 (512) (associated with input X1 (401)=0) and one of the second learning algorithm 3 (513) or the second learning algorithm 4 (514) (associated with input X1 (401)=1). In addition, the operational output accessing module 116 may be configured to calculate a weighted average of the outputs of the at least two of the second learning algorithms 511-514 produced as a result of processing the operational data unit 602 (operation 1206). For example, if the operational data unit 602 with a value for X1 (401) of 2 was directed to both the second learning algorithm 1 (511) and the second learning algorithm 3 (513), the operational output accessing module 116 may calculate a weighted average of the outputs Y1 (411) and Y2 (412) of the second learning algorithm 1 (511) and the second learning algorithm 3 (513) to generate a single value each for outputs Y1 (411) and Y2 (412). Moreover, the operational output accessing module 116 may more heavily weight one of the second learning algorithms 1 or 3 (511 or 513) based on which of the previously observed states of X1 (401) (e.g., 0 or 1) is considered to be closer or more like the previously unknown state of X1 (401) (e.g., 2).

In at least some of the embodiments described above, the modeling system 100 may decompose a first or original learning model or algorithm into smaller or simpler multiple learning algorithms to be trained and subsequently operated concurrently or simultaneously on separate processors or processing units of a computing system. Accordingly, the overall execution time of the learning model may be greatly accelerated, and thus may be capable of handling larger operational data sets than previously contemplated. Further, since each of the generated multiple learning algorithms is configured to be trained on separate partitions (501-504) of a sample data set, as well as on different operational data units, the amount of communication or coordination between the multiple learning algorithms is minimized, thus potentially maximizing any speed-up provided by the multiple learning algorithms being trained and operated on the separate processors.

Figure 13:
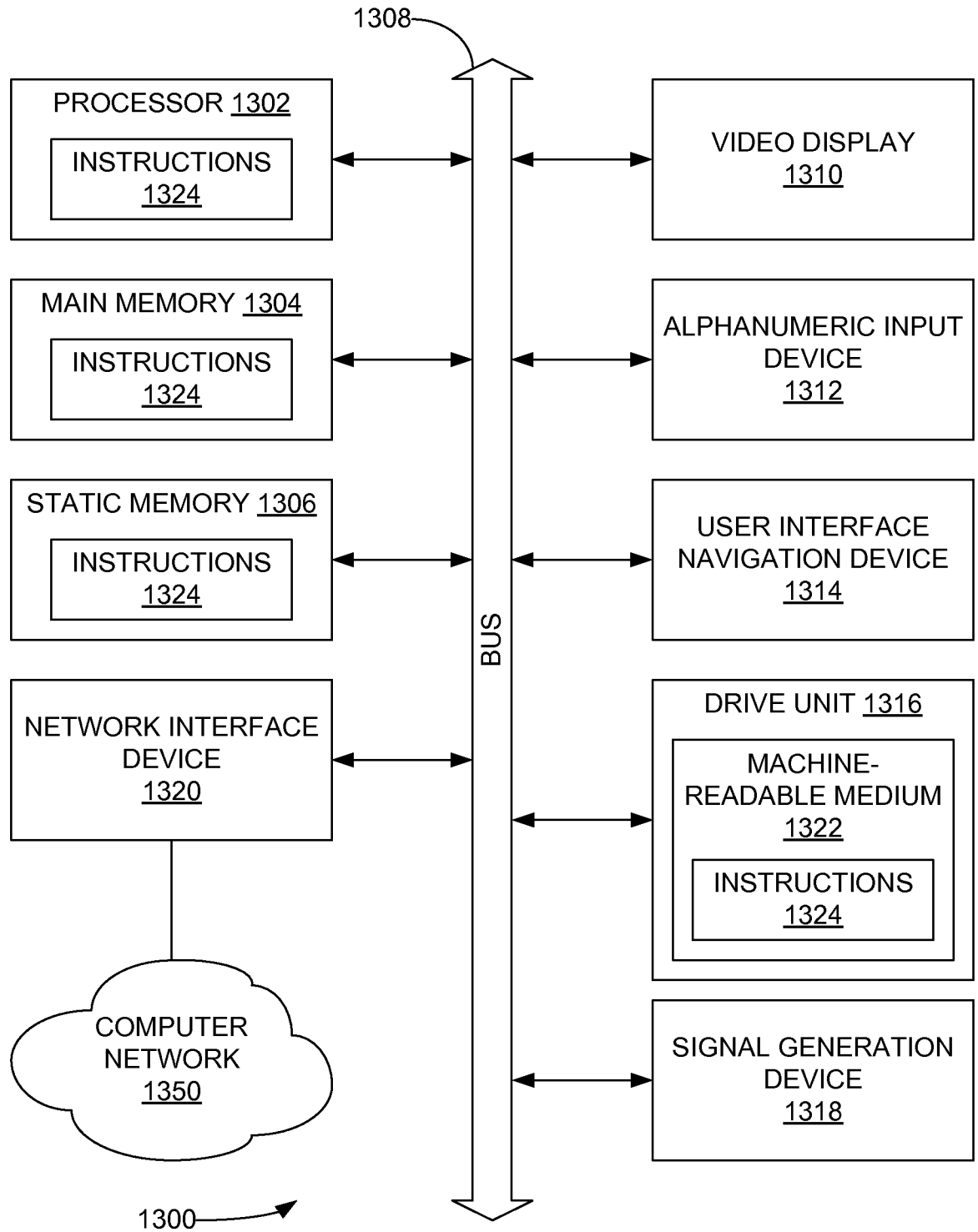
FIG. 13 is a block diagram of a machine in the example form of a processing system within which may be executed a set of instructions for causing the machine to perform any one or more of the methodologies discussed herein.

FIG. 13 depicts a block diagram of a machine in the example form of a processing system 1300 within which may be executed a set of instructions 1324 for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions 1324 (sequential or otherwise) that specify actions to be taken by that machine. Further, while only a single machine is illustrated, the term "machine" shall also be taken to include any collection of machines that individually or jointly execute a set (or multiple sets) of instructions 1324 to perform any one or more of the methodologies discussed herein.

The example of the processing system 1300 includes a processor 1302 (e.g., a central processing unit (CPU), a graphics processing unit (GPU), or both), a main memory 1304 (e.g., random access memory), and static memory 1306 (e.g., static random-access memory), which communicate with each other via bus 1308. The processing system 1300 may further include video display unit 1310 (e.g., a plasma display, a liquid crystal display (LCD), or a cathode ray tube (CRT)). The processing system 1300 also includes an alphanumeric input device 1312 (e.g., a keyboard), a user interface (UI) navigation device 1314 (e.g., a mouse), a disk drive unit 1316, a signal generation device 1318 (e.g., a speaker), and a network interface device 1320.

The disk drive unit 1316 (a type of non-volatile memory storage) includes a machine-readable medium 1322 on which is stored one or more sets of data structures and instructions 1324 (e.g., software) embodying or utilized by any one or more of the methodologies or functions described herein. The data structures and instructions 1324 may also reside, completely or at least partially, within the main memory 1304, the static memory 1306, and/or within the processor 1302 during execution thereof by processing system 1300, with the main memory 1304, the static memory 1306, and the processor 1302 also constituting machine-readable, tangible media.

The data structures and instructions 1324 may further be transmitted or received over a computer network 1350 via network interface device 1320 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 1300) or one or more hardware modules of a computer system (e.g., a processor 1302 or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 1302 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose processor 1302 that is configured using software, the general-purpose processor 1302 may be configured as respective different hardware modules at different times. Software may accordingly configure the processor 1302, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses that connect the modules). In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 1302 that are temporarily configured (e.g., by software) or permanently configured to perform the relevant operations. Whether temporarily or permanently configured, such processors 1302 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 1302 or processor-implemented modules. The performance of certain of the operations may be distributed among the one or more processors 1302, not only residing within a single machine but deployed across a number of machines. In some example embodiments, the processors 1302 may be located in a single location (e.g., within a home environment, within an office environment, or as a server farm), while in other embodiments, the processors 1302 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method of using a plurality of processors, of a computer, in parallel to develop a learning model, the method comprising:

accessing, using at least one of the processors, a database storing a sample data set to train the learning model, wherein the learning model comprises a first learning algorithm having a number of inputs and a number of outputs, and wherein each sample of the sample data set comprises a state for each of the inputs and the outputs;

counting, using at least one of the processors, a number of states for each of the inputs of the samples of the sample data set;

selecting a subset of the inputs;

partitioning, using at least one of the processors, the sample data set into a number of partitions equal to a combined number of states of the selected inputs, wherein each of the partitions corresponds to a combined state of the selected inputs and each of the partitions includes the samples of the sample data set that exhibit a same combined state of the selected inputs corresponding to the partition;

creating, using at least one of the processors, a second learning algorithm for each of the partitions, wherein the second learning algorithm for a partition comprises logic of the first learning algorithm in which the combined state of the selected inputs is equal to the combined state that corresponds to the partition, and wherein the second learning algorithm is configured to receive as input those of the inputs that are not the selected inputs;

assigning each of the second learning algorithms to one of the plurality of processors;

training each of the second learning algorithms on the processor assigned to the second learning algorithm using the samples of the partition corresponding to the second learning algorithm to generate trained second learning algorithms;

receiving a plurality of operational data units comprising a state for each of a plurality of inputs corresponding to the inputs of the sample data set;

directing each of the plurality of operational data units as input to one of the trained second learning algorithms based on a combined state of the selected inputs corresponding to the operational data unit; and generating an output for each of the plurality of the plurality of operational data units from the corresponding trained second learning algorithm.

2. The method of claim 1, wherein generating an output for each of the plurality of the plurality of operational data units from the corresponding trained second learning algorithm comprises:

accessing the plurality of operational data units; and providing each of the operational data units to the decision logic for execution by a corresponding one of the second learning algorithms on a corresponding one of the processors; and generating, for each of the operational data units, an output for the operational data unit from the corresponding second learning algorithm for each of the outputs of the sample data set.

3. The method of claim 2, wherein the determining of the number of states for each of the inputs based on the sample data set comprises determining a number of employed states for each of the selected inputs of the sample data set.

4. The method of claim 3, wherein:

the accessing of the operational data units comprises accessing a first operational data unit that includes a first input of the selected inputs having a state that is not employed in the sample data set; and the decision logic directs the first operational data unit as input to the second learning algorithm corresponding to one of the employed states of the first input.

5. The method of claim 3, wherein:
the accessing of the operational data units comprises accessing a first operational data unit that includes a first input of the selected inputs having a state that is not employed in the sample data set;
the decision logic directs the first operational data unit as input to at least two of the second learning algorithms, wherein each of the at least two of the second learning algorithms corresponds to one of the employed states of the first input; and
the method further comprises calculating a weighted average of corresponding outputs of the at least two of the second learning algorithms to produce an output for the first operational data unit.

6. The method of claim 1, wherein:
the combined number of states of the selected inputs is a greatest whole number less than or equal to a number of the plurality of processors; and
the assigning of each of the second learning algorithms comprises assigning each of the second learning algorithms to a separate one of the plurality of processors.

7. The method of claim 1, wherein:
the combined number of states of the selected inputs is a least whole number greater than a number of the plurality of processors of the computing system; and
the assigning of each of the second learning algorithms comprises assigning a first one of the second learning algorithms and a second one of the second learning algorithms to a same one of the plurality of processors.

8. The method of claim 7, wherein:
the training of each of the second learning algorithms comprises training the first one of the second learning algorithms, followed by training the second one of the second learning algorithms.

9. The method of claim 1, further comprising:
determining a state distribution of each of at least some of the inputs;
wherein at least one of the selected inputs has a more uniform state distribution than at least one unselected input of the plurality of inputs.

10. The method of claim 1, wherein:
the first learning algorithm comprises a first artificial neural network having a first number of hidden neurons;
each of the second learning algorithms comprises a second artificial neural network; and
the method further comprises setting a second number of hidden neurons of at least one of the second artificial neural networks based on the first number of hidden neurons.

11. The method of claim 10, wherein the second number of hidden neurons is equal to the first number of hidden neurons based on the first number of hidden neurons being less than twice the number of inputs minus twice a number of the selected inputs.

12. The method of claim 10, wherein the second number of hidden neurons is equal to twice the number of inputs minus twice a number of the selected inputs based on the first number of hidden neurons being less than or equal to four times the number of inputs minus four times the number of selected inputs, and being greater than or equal to twice the number of inputs minus twice the number of selected inputs.

13. The method of claim 10, wherein the second number of hidden neurons is equal to the first number of hidden neurons minus twice the number of inputs, minus twice a number of the selected inputs, based on the first number of hidden neurons being greater than four times the number of inputs minus four times the number of selected inputs.

14. The method of claim 1, wherein the determining of the number of states for each of the inputs based on the sample data set comprises determining a number of possible states for each of the selected inputs of the sample data set.

15. The method of claim 1, wherein the first learning algorithm and each of the second learning algorithms comprises an artificial neural network.

16. The method of claim 1, wherein the first learning algorithm and each of the second learning algorithms comprises a supervised learning algorithm.

17. The method of claim 1, wherein the first learning algorithm and each of the second learning algorithms comprises an unsupervised learning algorithm.

18. A non-transitory computer-readable storage medium comprising instructions that, when executed by at least one processor of a computing system, cause the computing system to use a plurality of processors in parallel to develop a learning model by performing operations comprising:
accessing a sample data set to train a learning model, wherein the learning model comprises a first learning algorithm having a number of inputs and a number of outputs, and wherein each sample of the sample data set comprises a state for each of the inputs and the outputs;
determining a number of states for each of the inputs based on the sample data set;
selecting a subset of the inputs;
partitioning the sample data set into a number of partitions equal to a combined number of states of the selected inputs, wherein each of the partitions corresponds to a combined state of the selected inputs and each of the partitions includes the samples of the sample data set that exhibit a same combined state of the selected inputs corresponding to the partition;
creating a second learning algorithm for each of the partitions, wherein the second learning algorithm for a partition comprises logic of the first learning algorithm in which the combined state of the selected inputs is equal to the combined state that corresponds to the partition, and wherein the second learning algorithm is configured to receive as input those of the inputs that are not the selected inputs;
assigning each of the second learning algorithms to one of the plurality of processors;
training each of the second learning algorithms on the processor assigned to the second learning algorithm using the samples of the partition corresponding to the second learning algorithm to generate trained second learning algorithms;
receiving a plurality of operational data units comprising a state for each of a plurality of inputs corresponding to the inputs of the sample data set;
directing each of the plurality of operational data units as input to one of the trained second learning algorithms based on a combined state of the selected inputs corresponding to the operational data unit; and
generating an output for each of the plurality of the plurality of operational data units from the corresponding trained second learning algorithm.

19. A computing system for using a plurality of processors in parallel to develop a learning model, the computing system comprising:

at least one processor;

a memory comprising instructions which, when executed by the at least one processor, cause the computing system to perform operations comprising:

accessing a sample data set to train a learning model, wherein the learning model comprises a first learning algorithm having a number of inputs and a number of outputs, and wherein each sample of the sample data set comprises a state for each of the inputs and the outputs;

determining a number of states for each of the inputs based on the sample data set, select a subset of the inputs, and partition the sample data set into a number of partitions equal to a combined number of states of the selected inputs, wherein each of the partitions corresponds to a combined state of the selected inputs and each of the partitions includes the samples of the sample data set that exhibit a same combined state of the selected inputs corresponding to the partition;

creating a second learning algorithm for each of the partitions, wherein the second learning algorithm for a partition comprises logic of the first learning algorithm in which the combined state of the selected inputs is equal to the combined state that corresponds to the partition, and wherein the second learning algorithm is configured to receive as input those of the inputs that are not the selected inputs;

assigning each of the second learning algorithms to one of the plurality of processors of the computing system;

training each of the second learning algorithms on the processor assigned to the second learning algorithm using the samples of the partition corresponding to the second learning algorithm to generate trained second learning algorithms;

receiving a plurality of operational data units comprising a state for each of a plurality of inputs corresponding to the inputs of the sample data set;

directing each of the plurality of operational data units as input to one of the trained second learning algorithms based on a combined state of the selected inputs corresponding to the operational data unit; and generating an output for each of the plurality of the plurality of operational data units from the corresponding trained second learning algorithm.

20. The system of claim 19, further comprising instructions which, when executed by the at least one processor, cause the computing system to:

access the plurality of operational data units, and provide each of the operational data units to the decision logic for execution by a corresponding one of the second learning algorithms on a corresponding one of the processors; and generate, for each of the operational data units, an output for the operational data unit from the corresponding second learning algorithm for each of the outputs of the sample data set.

* * * * *